Figure 1:
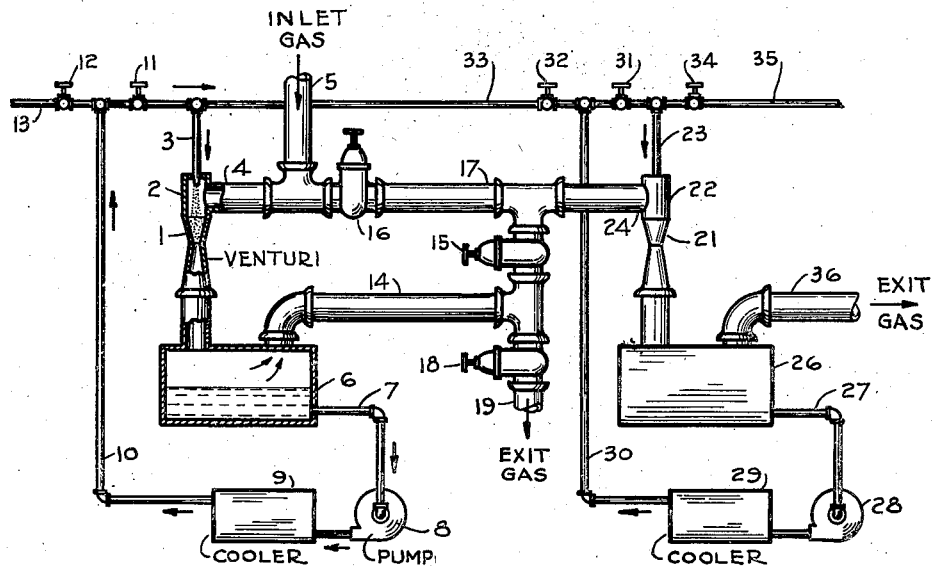

Aug. 23, 1938.   F. W. PARDEE, JR   2,127,571
ABSORPTION OF HYDROCHLORIC ACID IN LIQUIDS
Filed Aug. 21, 1935

INVENTOR.
FRED W. PARDEE, JR.
BY
Albert B. Griggs
ATTORNEY.

Patented Aug. 23, 1938

2,127,571

UNITED STATES PATENT OFFICE 2,127,571

ABSORPTION OF HYDROCHLORIC ACID IN LIQUIDS

Fred W. Pardee, Jr., Wilmington, Del., assignor, by mesne assignments, to E. I. du Pont de Nemours & Company, Wilmington, Del., a corporation of Delaware Application August 21, 1935, Serial No. 37,157

1 Claim. (Cl. 23—154)

This invention relates to apparatus and processes for the absorption of a gas in a liquid medium, and is particularly directed to apparatus and processes wherein a stream of hydrochloric acid gas is absorbed and motivated by a jet of an adsorbing medium operating in a venturi.

Hydrogen chloride and similar gases are customarily absorbed by passing them through a packed tower in countercurrent with a flow of an absorbing liquid. These towers are expensive to construct and to maintain, and they require heavy foundations, and a large amount of floor space.

The tower absorber may not satisfactorily be employed when a gas is to be absorbed in a solution of a salt where the absorption causes salting out of the solute. When hydrochloric acid gas, for instance, is absorbed in a twenty-eight per cent ammonium chloride solution at 25° C., only about twelve per cent of ammonium chloride remains in solution after about 13% HCl has been absorbed. The precipitated ammonium chloride, of course, clogs and stops up the tower.

Another commonly used method of absorption is that employing tourills. According to this method of operation, hydrogen chloride is absorbed by bringing it into contact with the surface of an absorbing medium. This method of absorption is none too efficient, and the apparatus ordinarily employed is rather expensive to construct and maintain. This type of absorption process, moreover, is not well adapted for the production of large quantities of high strength solutions.

Still another type of absorber which has been used to some extent is the so-called bubbler absorber in which a gas to be absorbed is introduced at or near the bottom of a body of absorbing liquid and allowed to bubble therethrough. This type of absorber, like the absorption tower, is relatively expensive to construct and operate. Moreover, the efficiency of the bubbler type of absorber is not as high as might be desired because of the relatively poor contact between the liquid and gas phases.

The bubbler type of absorber, like the absorption tower, is not particularly satisfactory for the absorption of a gas in a salt solution when there is a tendency for the solute to salt out.

Absorbers of the above mentioned types are exceedingly inflexible in operation. The packed tower absorber, particularly, is exceedingly slow to respond to changes in the rate of flow of liquid, and it is very difficult to adjust such absorbers to variations in the concentration of the gas to be absorbed.

An important consideration in the absorption of gases, particularly hydrochloric acid gas, is the problem of dissipating the heat of solution which is generated by the absorption of the gas in a liquid. The absorption equipment ordinarily employed usually depends, to a large extent, upon the radiation of heat to the surrounding air for disposing of the heat of absorption, and it has proven difficult adequately to cool such equipment.

Another difficulty encountered with the absorbing devices of the prior art is that of causing motion of the gases. With a corrosive gas, such as hydrogen chloride, there must be employed suitable fans or blowers which are relatively resistant to the action of the gas. Such equipment is quite expensive and is none too satisfactory.

It is an object of my invention to provide apparatus and processes for the absorption of gases in liquid media whereby corrosive gases, such as hydrochloric acid gas, may be absorbed with a minimum of equipment and expense. It is a further object of my invention to provide apparatus and processes whereby gases may be absorbed without difficulty in salt solutions from which the solute tends to salt out. It is a still further object of my invention to provided apparatus and processes whereby a gas stream may be circulated into contact with an absorbing liquid without the use of mechanically operated fans or blowers. It is a still further object of my invention to provide apparatus and processes which are flexible in operation, and which are quickly and readily responsive to changes in operating conditions. Still further objects of my invention will be apparent hereinafter.

My objects are accomplished, briefly, by forcing a jet of absorbing liquid into a venturi, and absorbing the gas by admitting it around the jet and drawing it through the venturi with the absorbing liquid. The jet of liquid acts in the venturi to absorb the gas and to cause a motion of the gas stream. The passage of the liquid and gas through the venturi promotes an intimate contact therebetween, with a resulting high absorption efficiency. The intimate contact obtained may be in part attributable to the alternate contraction and expansion of the gas and liquid stream, and to the turbulence caused thereby.

According to my invention, the absorbing liquid is collected after its passage through the venturi, pumped through a cooler, and then forced through a venturi for further absorption of gas.

Figure 2:
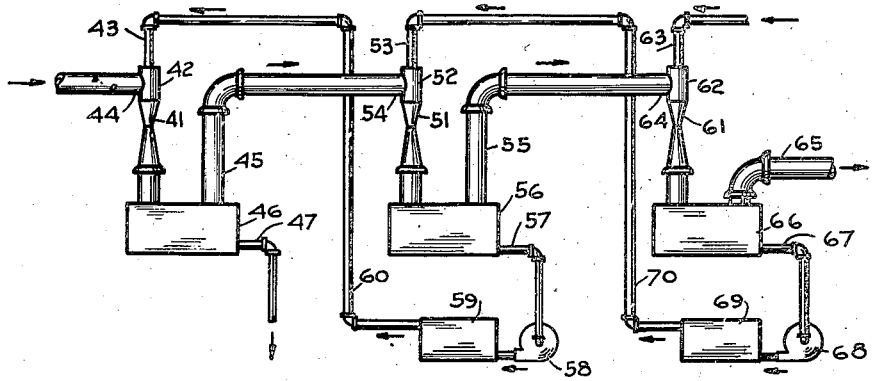

My invention may be better understood in its more specific aspects by reference to the accompanying drawing wherein:

Figure 1 illustrates a pair of cooperating absorbing units according to my invention, and Figure 2 illustrates an absorbing system wherein the gas to be absorbed and the absorbing liquid are passed in countercurrent.

Referring to the apparatus of Figure 1, there is seen a venturi 1 terminating at its upper portion in a cylindrical chamber 2. A gas conduit 4 leads hydrochloric acid gas from the gas inlet 5 to the chamber 2.

At the top of the chamber 2 there is provided a nozzle 3 for the introduction of the absorbing medium, an aqueous ammonium chloride solution. The nozzle is so located that the axis of the jet of absorbing liquid is concentric with the Venturi throat. The nozzle, moreover, should be of a type which produces a stream of finely divided particles of the absorbing liquid. It will be evident that the liquid must be admitted at the nozzle 3 at a pressure higher than that of the gas to be absorbed, in order to induce the flow of gas through the Venturi throat.

The liquid, after passing through the venturi 1, falls into the receptacle 6. Liquid from the chamber 6 is withdrawn through a pipe 7 by a pump 8, and forced through a cooler 9. The cooled liquid is forced through pipe 10, back to the nozzle 3.

It will be noted that there is a valve 11 provided in the pipe 10 which must be opened for the liquid to flow to the nozzle 3. It will also be noted that a valve 12 is provided in the extension 13, which valve must of course be closed when the valve 11 is open, to permit the recirculation of all of the absorbing liquid to the nozzle 3.

Unabsorbed gases pass from the chamber 6 through a conduit 14, which communicates with pipe 17 when the valve 15 is open, or which communicates with the gas exit pipe 19 when valve 18 is open. The gases from the pipe 17 pass through a pipe 24 into the chamber 22, which corresponds to the chamber 2 previously described. A nozzle 23 at the top of chamber 22 serves to admit a jet of the absorbing liquid, as does the nozzle 3 previously described, and the venturi 21 operates as does the venturi 1.

Below the venturi 21 is provided a receptacle 26 with an outlet 27, pump 28, and cooler 29. The absorbing liquid emerging from the cooler 29 is forced through pipe 30 and, when valve 32 is closed and valve 31 is open, is forced through nozzle 23. The valve 34 in the extension 35 must, of course, also be closed if all of the absorbing liquid is to be forced through the nozzle 23.

The gases which remain unabsorbed in the venturi 21 pass out of the chamber 26 through the exit conduit 36. A valve 16 in the interconnecting pipe 17 is normally closed, but it may be opened when the valve 18 is opened and the valve 15 is closed to permit the use of the absorbing devices in parallel rather than in series.

Considering the apparatus of Figure 1 with more particular reference to the processes of my invention, it is noted that, when the valve 16 is closed, gas admitted at the inlet pipe 5 is drawn through pipe 4 from the point of origin of the gas by the suction created by the venturi 1.

Hydrochloric acid gas admitted into the chamber 2 is carried into the venturi by the ammonium chloride solution stream admitted through the nozzle 3. The hydrochloric acid gas is absorbed by the liquid stream in the chamber 2, and in the venturi 1. The liquid and gas pass downwardly into the receptacle 6, the liquid falling into the bottom of the receptacle, and the gas separating and passing upwardly through the exit pipe 14, and through the open valve 15.

The liquid is drawn from the bottom of receptacle 6 by the pipe 7 and pump 8, and forced into the cooler 9 where, to the extent desired, the heat of reaction is dissipated. The cooler 9 may, of course, be of any known construction, and it will be employed only to the extent required to dissipate the desired proportion of the heat of absorption. The cooled liquid is forced, then, through pipe 10 and back into the chamber 2.

After the absorption unit has been in operation for a period of time, the ammonium chloride solution will be relatively saturated with respect to the hydrogen chloride, and at this time the valve 11 is closed and the valve 12 is opened. The pump 8 then forces the ammonium chloride solution through the pipe 13, from which point the solution is led to a suitable apparatus for converting the hydrochloric acid gas absorbed in the solution to ammonium chloride. The ammonium chloride so formed is crystallized from the solution in known manner, and the resulting ammonium chloride mother liquor is returned through the pipe 35, as will be explained later.

The gases leaving the receptacle 6 through pipe 14 are led to the chamber 23 through pipe 24, and are there absorbed by ammonium chloride introduced into the chamber through the nozzle 23. The pipe 36 serves as an exit for the inert gases which remain unabsorbed. The hydrochloric acid-containing solution is withdrawn through pipe 27 at the bottom of receptacle 26, and forced through a cooler 29 by a pump 28 after the manner previously described.

As has been above noted, the ammonium chloride mother liquor, which is used as an absorbing medium, is introduced from the crystallizer through the pipe 35; the valve 34, of course, being open. At the time of introducing a fresh charge of mother liquor, the valve 31 is preferably closed so that the mother liquor can be introduced directly into chamber 22 through the nozzle 23. After the fresh mother liquor has absorbed a certain amount of hydrochloric acid gas by recirculation through the pipes 27, 30, etc., the valve 31 is closed and the valve 32 is opened so that the mother liquor is forced through pipe 33 to the nozzle 3. The valve 11, of course, is closed so that the liquid will be forced through the nozzle into the chamber 2.

It will readily be understood that the amount of recirculation of the absorbing liquid depends largely upon the concentration of hydrogen chloride in the gas. When the gas has a high concentration of hydrochloric acid, it may be desirable to operate the apparatus of Figure 1 by keeping the valve 34 open and the valve 31 closed, the valve 32 open and the valve 11 closed, and the valve 12 open throughout the period of operation. In this way the absorbing liquid passes in contact with the hydrochloric acid-containing gas only twice before it is treated, as above described, to react the absorbed hydrochloric acid with ammonia.

If the hydrogen chloride concentration of the gases to be treated is relatively small, it will, of course, be desirable to recirculate the absorbing liquor a number of times. The specific conditions of operation will be determined in use according to the gas concentration, solubility, and other such factors.

Instead of operating the device with the flow of absorbent to gas countercurrent between the absorbers, as above described, it may sometimes be desirable to operate each absorbing unit separately. In this event, the valve 15 is closed, the valve 18 opened, and the valve 16 opened. When the valve 16 is open, gas from the inlet 5 flows directly to both chamber 2 and chamber 22. According to this method of operation, the absorbing liquor is preferably recirculated in its absorbing unit until an adequate amount of gas has been absorbed, and then the liquid is withdrawn and replaced with fresh absorbing material.

Instead of operating the apparatus of Figure 1 as above described, it may be found desirable to operate it in a continuous manner with partial recirculation.

According to this method of operation, the absorbing liquid is continuously suppled through pipe 35 and valve 34. The liquor from pipe 30 is split, by suitable adjustment of valves 31 and 32, so that a portion is recirculated thru the jet 23 while the remainder passes thru pipe 33 to the jet 3.

By a similar adjustment of valves 11 and 12, the liquor from pipe 10 is split so that a part is recirculated thru jet 3 and the remainder is conducted, by pipe 13, to a suitable place for the reaction of the absorbed hydrochloric acid with ammonia. According to this method of operation, the gas and liquid flows are in countercurrent relation from one absorber to the next.

It will be understood from the foregoing and from the drawing that the flow of liquid and gas in an absorption unit is co-current, and that the countercurrent flow of liquid and gas is effected with reference to the flows from one absorber to the next.

While I have disclosed ammonium chloride solutions as an absorbent liquid for hydrochloric acid gas, it will readily be understood that other suitable liquids may be used. I may, for instance, use other salts of hydrochloric acid such as zinc chloride, or, again, I may use water or an ammonium hydroxide solution. It will readily be understood that the venturi 1, chamber 2, etc., may be used for the absorption of hydrochloric acid gas in water, and that the chamber 22, venturi 21, etc., may be used with an absorbing medium such as an ammonium hydroxide solution which more readily absorbs the gas than does water.

The absorption of hydrochloric acid gas in liquid absorbing media is almost instantaneous, and the processes and apparatus of my invention are peculiarly adapted to its absorption. The processes and apparatus of my invention, however, may advantageously be employed for the absorption of other gases, such as sulfur trioxide or ammonia.

It will be apparent that the apparatus of my invention is particularly suited to the absorption of a gas in a solution of one of its salts which tends to salt out. The salting out of the solute by the absorbed gas will not clog the apparatus for, as is apparent, the jet, venturi, etc., are self cleaning. It may under some circumstances be found desirable to provide means in conjunction with the coolers for removing salts which separate from the solution, but ordinarily the velocity of the flow of solution is adequate to prevent clogging of the pipes 7, 10, etc. Moreover, when the solute shows a tendency to salt out, it may be found desirable to employ only a small amount of cooling so that the solution will always be warm enough to avoid any substantial salting out of the solute.

It will also be apparent from the foregoing that the apparatus of Figure 1 is readily responsive to changes in the conditions of operation. Any variation in the concentration of the gas to be absorbed can quickly be compensated by adjustment of the rate of liquid flow through the nozzle 3. The valves 15, 16, 34, 31, 32, etc., may also be employed, as noted above, to adjust the apparatus to various conditions of operation.

In Figure 2 there is shown an apparatus particularly suitable for use in processes for the production of aqueous solutions of hydrochloric acid. The Venturi throats 41, 51, and 61 correspond to the venturi 1 previously described. Chambers 42, 52, and 62 correspond to the chamber 2 above described, and nozzles 43, 53, and 63 correspond to the nozzles 3 and 23 above described.

The hydrochloric acid-containing gases are drawn into the apparatus through the pipe 44. The gases pass down through the venturi 41, and the unabsorbed gases escape from the receptacle 46 through the pipe 45. These gases are then drawn through the pipe 54 into the chamber 52 and down through venturi 51. The unabsorbed hydrochloric acid gas which passes into the chamber 56 escapes through the outlet pipe 55. The gases are then drawn through pipe 64 into the chamber 62, and the remaining hydrochloric acid gas is absorbed in the Venturi throat 61. The waste gases leave the chamber 66 through the outlet 65.

The water which is used for absorbing the hydrochloric acid flows in countercurrent thereto so that the more dilute gases are subjected to the absorbing action of water which contains little dissolved hydrochloric acid. The water of course, contacts last the most concentrated gases which, in accordance with well-known chemical principles, results in a more concentrated, aqueous hydrochloric acid solution.

Tracing the flow of absorbent through the system, it is noted that water is admitted from a suitable source through the jet 63 into the chamber 62. The water, which has already absorbed some hydrochloric acid gas, is withdrawn from the bottom of receptacle 66 through the pipe 67, and forced by the pump 68 through the cooler 69. The cooler, of course, serves to dissipate the heat generated by the absorption of the hydrochloric acid gas in water.

The cooled, dilute hydrochloric acid solution is forced through pipe 70 to the jet nozzle 53. The liquid absorbent is then subsequently withdrawn from the bottom of receptacle 56 by the pipe 57 and forced by the pump 58 through the cooler 59. The cooled absorbent is forced through the pipe 60 to the jet nozzle 43 to absorb incoming hydrochloric acid gas in the chamber 42 and venturi 41. The concentrated solution of hydrochloric acid is withdrawn at the bottom of receptacle 46 through the pipe 47. The hydrochloric acid solution withdrawn through pipe 47 may, if desired, be cooled and/or subjected to any further desired treatment.

It will, of course, be apparent that the apparatus and processes of Figure 2 may advantageously be employed for the countercurrent absorption of various gases, such as sulfur trioxide or ammonia, in suitable absorbing liquids.

It will be understood that the type of cooling means employed in the above illustrative forms of apparatus may be widely varied without departing from the spirit of my invention. I may, for instance, cool the absorbing liquid as it passes thru the Venturi throat by the use of suitable external or internal heat exchange means associated with the throat. Again, it might be advantageous to cool the gases instead of the absorbing liquid.

While I prefer, as above set forth, to rely on the effect of the Venturi throats for causing a motion of the gas being absorbed, it may sometimes be found desirable to aid the gas flow with small fans or blowers of suitable design. A suction fan, for instance, may be used at the exit pipes 19, 36, and 65.

While I have disclosed certain specific forms of apparatus and certain processes, it will readily be understood that I do not intend to be restricted thereby, the scope of my invention being set forth in the following claim.

I claim:

In a process for the absorption of hydrochloric acid gas, the steps comprising admitting the hydrochloric acid gas to the suction side of a venturi, directing a jet of an aqueous absorbent into said venturi whereby the hydrochloric acid gas is drawn into and dispersed throughout the aqueous absorbent passing trough the venturi, then separating the unabsorbed gases from said absorbent, admitting the unabsorbed gases to the suction side of a second venturi, directing a second jet of an aqueous absorbent having greater affinity for hydrochloric acid gas than the first-named absorbent into said second venturi whereby the unabsorbed gases are drawn into and dispersed throughout the second aqueous absorbent passing through the second venturi, thereby compensating at least in part for the relative impoverishment of the unabsorbed gases by the greater affinity of the second absorbent for hydrochloric acid gas, then separating the unabsorbed gases from the second aqueous absorbent and introducing the separated second aqueous absorbent into the first named venturi as the jet of the first named aqueous absorbent therefor, whereby aqueous absorbent is passed through the second venturi co-current with the flow of gases therethrough, is led to the first named venturi countercurrent and separate from the flow of gases therefrom, and is passed through the first named venturi co-current with the flow of gases therethrough.

FRED W. PARDEE, Jr.